(No Model.)  4 Sheets—Sheet 3.
E. B. STOCKING.
METHOD OF AND MEANS FOR MAKING CELL CASES.
No. 276,497.  Patented Apr. 24, 1883.
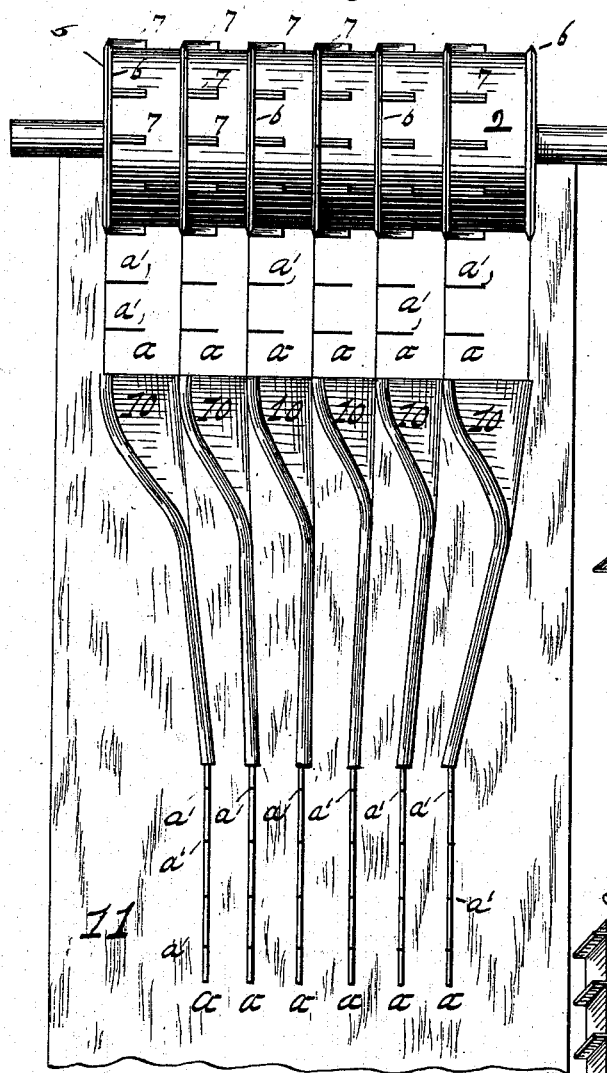
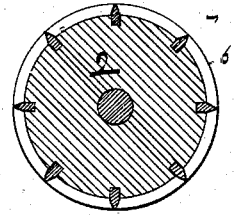
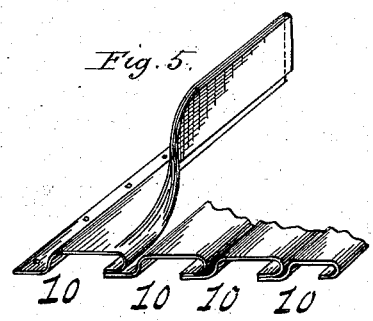
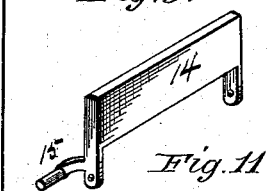
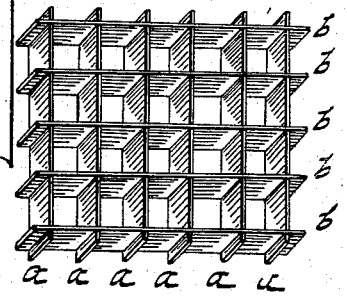
Witnesses:
Inventor:

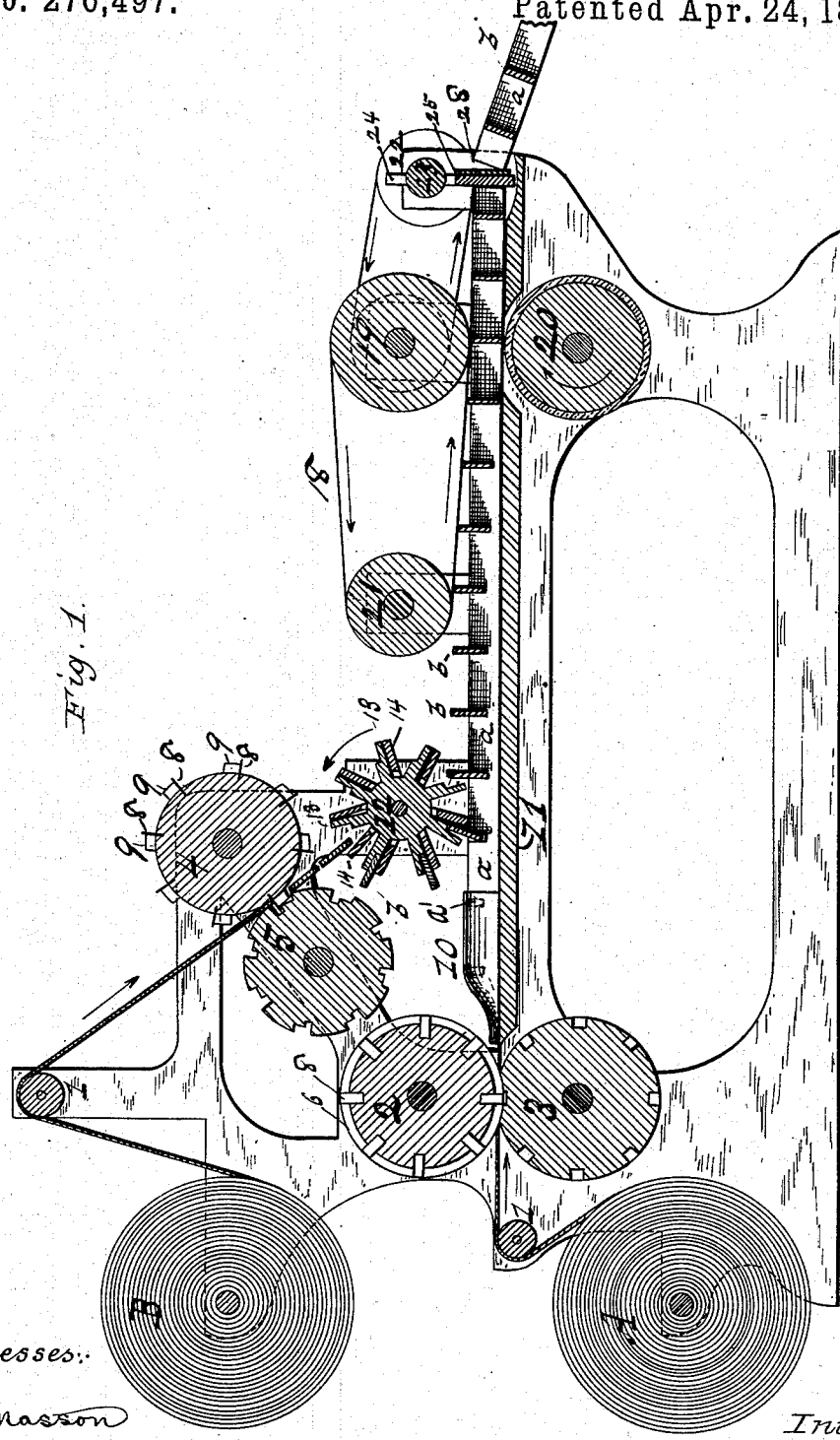

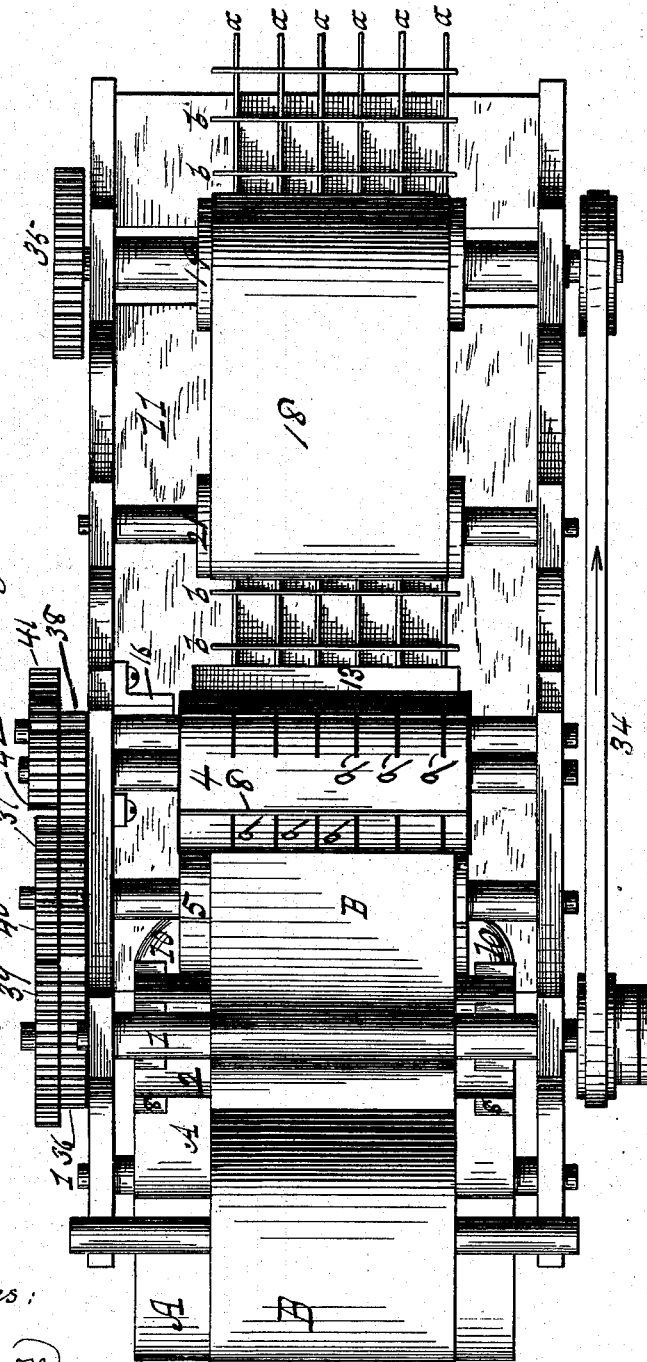

(No Model.)  4 Sheets—Sheet 4.
E. B. STOCKING.
METHOD OF AND MEANS FOR MAKING CELL CASES.
No. 276,497.  Patented Apr. 24, 1883.
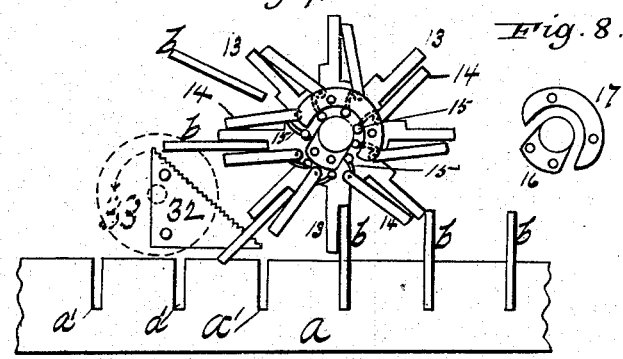
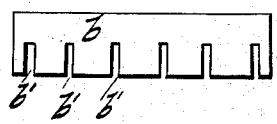
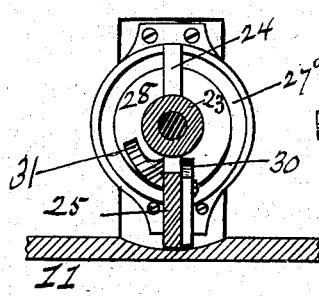
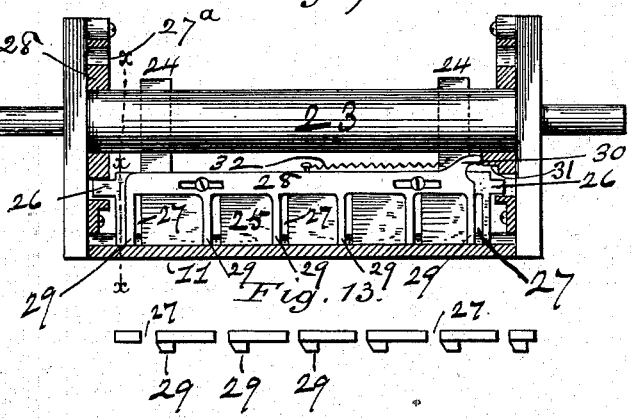
Witnesses:
W. B. Masson
J. H. Paine
Inventor:
E. B. Stocking

UNITED STATES PATENT OFFICE.

EDGAR B. STOCKING, OF WASHINGTON, DISTRICT OF COLUMBIA.

METHOD OF AND MEANS FOR MAKING CELL-CASES.

SPECIFICATION forming part of Letters Patent No. 276,497, dated April 24, 1883.

Application filed November 21, 1882. (No model.)

*To all whom it may concern:*

Be it known that I, EDGAR B. STOCKING, of Washington, District of Columbia, have invented a certain new and useful Method of and Means for Making Cell-Cases, of which the following is a specification, reference being had therein to the accompanying drawings.

The object of my invention is to provide a method of and means for the rapid manufacture of cell-cases—such as egg-trays, used for the transportation of eggs, and similarly-partitioned boxes—constructed of straw-board or other suitable material, formed into strips half-jointed, and assembled in two series, each at right angles to the other, and this by a simple method and means, and the latter adapted to operate continuously. So far as my knowledge of the art extends, such cases have been heretofore made by forming separate strips of the desired length for one tray, and assembling therewith similar strips separately and successively to produce a single tray, and the mechanism heretofore employed has comprised generally intermittently-operated strip-forming devices, combined with intermittently-operated assembling devices. By my method one of the series of strips is continuous, and may be termed the "longitudinal strips," with which I assemble the transverse strips of the desired length, which may be either the width of the tray to be produced or any multiple of that width. By my means a continuous operation of all the devices employed is accomplished.

My invention therefore consists, first, in presenting a series of continuous parallel longitudinal strips, and assembling therewith successive transverse strips. By this method I produce a continuous tray, or a tray of indefinite length, of the desired width, which may be subsequently subdivided into shorter trays of the desired length.

My invention therefore consists, second, in presenting a continuous series of parallel longitudinal strips, assembling successive transverse strips, and separating the assembled strips into trays. Forming the longitudinal strips in a continuous series enables me to employ continuously-operating strip-forming mechanism for both the longitudinal and the transverse strips, and, provided a continuously-operating assembling means is combined therewith, I accomplish continuity in operation of all the devices employed. To assemble the strips each series must be presented opposite to the other, edge to edge, and this I accomplish by subjecting the longitudinal strips to the operation of presenting devices.

Therefore my invention consists, third, in the combination of continuously-operating strip presenting and assembling mechanisms.

My invention further consists in certain features hereinafter described, and specifically set forth in the claims.

Referring to the drawings, Figure 1 is a central vertical longitudinal section of a machine constructed in accordance with my invention and adapted to practice my method. Fig. 2 is a plan with the transverse cutter and a cam, 17, removed. Fig. 3 is a partial plan, showing the upper roll for making longitudinal strips, and the guides for turning said strips upon edge and presenting them in parallel positions the desired distances apart from each other. Fig. 4 is a vertical transverse section of said roll; Fig. 5, a detail perspective of one of the guides, with portions of others arranged in series. Fig. 6 is a perspective of one of the movable jaws of the assembling-cylinder 12; Fig. 7, an end elevation, enlarged, illustrating the reception, carrying, and delivering of strips by the cylinder 12, and modified means for slotting said strips; Fig. 8, a detached view of the cams for operating the movable jaws 14. Fig. 9 is an elevation, with parts in section, of the transverse severing mechanism. Fig. 10 is a front elevation of the cams for operating said mechanism, some of the adjacent parts in the figure being in section. Figs. 11 and 12 are respectively a perspective of a tray and an elevation of one of the strips or partitions thereof. Fig. 13 is a bottom edge view of the cutting-blades in the position they occupy before a cut is made.

Like letters indicate like parts in all the figures.

In a suitable frame-work are supported by usual means two webs of straw-board or other suitable material, the one, A, being of suitable width to produce a desired number of strips, *a*, and the other, B, of suitable width to produce strips *b* of desired length. The webs are conducted over suitable guide-rolls, 1, and through and between rotary cutters and slitters or slotters, the former web, A, between the cutting and slotting rolls 2 3, and the latter web, B, between somewhat similar rolls, 4 5. The roll 2 is provided with a desired number of rotary cutters, 6—in this instance seven (see Figs. 3 and 4)—the two outer cutters being unnecessary, unless to trim a too wide web to the desired width. Arranged with the cutters 6 are slitters 7, or it may be, if preferred, punches 8, (see Fig. 1,) to produce either slits or slots $a'$, as desired, at desired distances from each other along one edge of the strips $a$, formed by the rotary cutters 6. The roll 3 is a counterpart to the roll 2, and, being constructed after the usual rotary cutting and punching rolls, requires no elaborate description. The rolls 4 and 5 are adapted by transverse cutters 8 and circumferential slitters 9 to produce the cross-strips $b$ from the web B, the size and length of these rolls and the number and location of cutters and punches being determined by the proportions of the strips to be produced. The strips $a$, formed and slotted by the rolls 2 3, pass through presenting-guides 10, the function of which is to turn the strips from a flat to an upright position. The guides 10 consist of strips of sheet metal, bent to the form shown (see Fig. 5) and placed side side, and secured to the bed 11 of the machine, so that the strips, when flat, enter the guides and issue therefrom upright and parallel to and equidistant from each other, the distance from one strip to the other being equal to the distance from one slot $b'$ to another in the strip $b$. As fast as produced by the rolls 4 5 the strips $b$ fall (or they may pass over a bridge properly located) into the assembling-cylinder 12, which consists of a series of fixed jaws, 13, and movable jaws 14, (see Fig. 6,) adapted by means of crank-arms 15 and cams 16 and 17 (see Figs. 2, 7, and 8) to open and close during their rotation, so as to seize, convey, and deliver the cross-strips $b$ upon the strips $a$ and at the slots $a'$ therein, as clearly shown in the figures referred to, the requisite of similar surface speed in the assembling-cylinder 12, and all the remaining rotating devices being secured in a manner hereinafter described. It is apparent that the strips $b$, projecting beyond the periphery of the jaws of the assembling-cylinder, will, at their slotted edges, come astride the strips $a$—that is, the strips $a$, being properly presented by the guides 10, will enter the slots of the strips $b$, and, as cylinder 12 rotates at the same surface speed as that at which the strips $a$ are fed by rolls 2 and 3, the cross-strips $b$, when upright, as shown in Fig. 7, will be at and slightly entered into the slots $a'$ of the strips $a$. These slots being in line transversely, as shown in Fig. 3, nothing remains but to force the strips $b$ home. To accomplish this, bottoming devices may be added to the assembling-cylinder and operated by connecting them to the movable jaws, so as to force the strips down at and during the opening of the jaws; but as this would make the machine complex I have illustrated a preferable means for bottoming the cross-strips, which consists of an endless belt, 18, which encompasses the roll 19, and thus, in connection with a companion rubber-coated roll, 20, acts to feed or draw the strips, in addition to forcing the cross-strips home. The two rolls 19 and 20, without the belt 18, would do this work; but to make the operation of forcing the strips $b$ home gradual, and to avoid the possibility of bending them transversely, I employ the belt and a roll, 21, with the bottom line thereof elevated above the bottom line of roll 19, and as the belt has the same surface speed as the remaining elements of the machine, the cross-strips pass under and along with the belt, and are gradually depressed until finally sent home by rolls 19 and 20, which completes practically the construction of a continuous tray, which may afterward, and by hand or separate machinery, be severed into separate trays. However, in Figs. 1, 9, 10, and 13 I illustrate novel means embodied in and adapted to operate with the other elements of my machine, which act to sever the continuous tray into separate trays of any desired number of cells in length. A pulley, 22, belted to roll 19, rotates a shaft, 23, through which arms 24 24 of ledger-blade 25 are adapted to slide. Projecting lugs 26 ride in a cam-groove, $27^a$, of a cam, 28, fixed to the frame of the machine, said groove being of such shape that as the shaft rotates the blade is raised and lowered, the latter movement taking place after the blade, at its lower edge, (which is slotted at 27 to register with and receive the longitudinal strips $a$,) has passed within a transverse series of cells. Upon the blade 25 is a reciprocating plate, 28, having depending blades 29 and a projecting lug, 30, adapted to ride a face-cam, 31, which causes the blades 29 to pass over the slots 27 and sever the strips $a$, passing therethrough to reach below the upper surface of the table, which is cut away. The blades 25 and 29 permit this operation of the blades. By means of the spring 32, secured to the plate 28 and to one of the arms 24, the said blades 29 are retracted to the opposite sides of the slots 27, as shown in Fig. 13. By varying the speed of rotation of the shaft 23, when the blades 25 and 29 are out of the cells, and giving it a uniform speed of rotation with that of the feed of the cells when the blades are in them, this transverse cutting mechanism may be adapted to sever from the continuous tray separate trays of different lengths.

I deem it proper to mention some of the many obvious modifications and partial applications of my invention as herein disclosed which may be employed, but which I consider fully comprehended by and embraced in my said invention.

I may omit the rolls 2 and 3, and feed previously-prepared strips $a$ into the presenting devices.

I may omit the rolls 4 and 5, and feed previously-prepared cross-strips $b$ into the assembling device.

I may omit the assembling device 12, and add its function to those set forth herein, as performed by the belt 18—that is, I may extend the belt 18 to a roll, in place of cylinder 12, and provide the belt with suitable fixed and movable jaws to receive, convey, and assemble and bottom the cross-strips.

I may provide transverse severing-knives (one or more) at or on the rolls 2 and 3, so that at that point the longitudinal continuous strips would be cut into desired lengths, each successive length pushing its predecessor through the presenting-guides until a first cross-strip is united to the longitudinal strips by the assembling device, and then depend upon said device to assist, if necessary, in feeding the tray to the endless belt, which dependence for feed would not exist if the belt 18 were performing the assembling function, or if the presenting device were shorter than the tray to be formed.

I may omit the punches or slitters 9 from the rolls 4 5, and employ a series of fixed or rotary saws, 32 33, respectively (see Fig. 7,) located in the path of the strips when in the assembling device, and thus form the slots $b'$ therein; and, so far as my method of making cell-cases or trays is concerned, any devices which coact to present continuously a parallel series of strips with their slotted edges toward and to receive the cross-strips continuously would, I deem it proper to state, be an employment and a practicing of my invention.

I may increase or diminish the number of knives and slitters, or the number of pockets or fixed and movable jaws in the assembling device, so long as the product of the one pair of cutters is adapted to be assembled with the product of the other pair of cutters; and therefore I do not limit myself otherwise in the proportion or location of the elements of my machine.

It is apparent that the well-known intermittent-strip-forming mechanism could be substituted for rolls 4 and 5, and that any well-known guides which will act to turn the longitudinal strips from a flat to an upright position may be substituted for the guides 10.

In Fig. 2 I have illustrated one train or system of gearing for imparting motion to the movable elements of my machine; but I do not limit myself thereto, as any known power-conveying devices which will produce the correct direction and speed of movement of those elements may be employed. The shaft of roll 3 is in this instance selected as the main shaft of the machine, and is therefore provided with the ordinary fast and loose driving-pulleys, and a third pulley, from which extends a belt, 34, to a similar pulley on the shaft of roll 20, which is geared to roll 19 by a companion gear (not shown) to gear 35. Rolls 2 and 3 are geared together by gear 36 and its companion. (Not shown.) Rolls 4 and 5 are geared together by gears 38 and 37, respectively; and rolls 2 and 5 are geared together by gears 39 and 40. The assembling-cylinder 12 is driven by gears 41 and 42 and an intermediate gear. (Not shown.) The several arrows indicate the direction of movement of the elements or material at the points where said arrows appear.

What I claim as new, and desire to secure by Letters Patent, is—

1. A step in the art of making cell-cases or trays, which step consists in presenting a series of continuous parallel longitudinal strips and assembling therewith successive transverse strips.

2. The method herein set forth of making cell-cases, which consists in presenting a continuous series of parallel longitudinal strips, assembling successive cross-strips, and severing the longitudinal strips to form separate trays.

3. In a machine for making cell-cases, the combination of strip-forming mechanism, strip-presenting mechanism, and strip-assembling mechanism, all substantially as described, each adapted to operate continuously, substantially as and for the purpose set forth.

4. The combination of rotary strip-forming mechanisms, continuously-operating strip-presenting mechanism, and rotary strip-assembling mechanism, all substantially as shown and described.

5. The combination of rotary strip-forming mechanism, continuously-operating strip-assembling mechanism, continuously-operating presenting mechanism, and rotary bottoming mechanism, all substantially as shown and described.

6. In a cell-case machine, the combination of rotary strip-forming mechanisms, continuously-operating strip-presenting mechanism, rotary assembling mechanism, rotary bottoming mechanism, and rotary transverse severing mechanism, all substantially as shown and described.

7. In a cell-case machine, the rotary cutting and punching rolls 2 and 3, comprising circumferential knives 6 6 6, and longitudinally and intermediately arranged slitters or punches 7 7 7 in one of said rolls and corresponding grooves and depressions in the other of said rolls, substantially as shown and described.

8. The combination, in a cell-case machine, of two rotary cutting and punching rolls, as 4 5, the one comprising transverse cutters 8 8 8, and circumferentially and intermediately arranged slitters or punches 9 9 9, substantially as shown and described.

9. In a cell-case machine, the combination of two pairs of strip-forming rolls, the cutting and punching devices in each pair being oppositely arranged to those in the other, substantially as shown and described.

10. In a cell-case machine, the guides 10, formed to receive a strip in a flat condition, and curved to deliver the same in an upright position, substantially as shown and described.

11. In a cell-case machine, the rotary assembling-cylinder 12, comprising fixed and movable jaws arranged and operating to receive, convey, and assemble or place successive cross-strips, substantially as shown and described.

12. In a cell-case machine, bottoming devices comprising an endless belt arranged to gradually approach the partially-assembled strips, and a strip-supporting bed, substantially as shown and described.

13. In a cell-case machine, a transverse cutter comprising a slotted ledger or relatively-fixed blade, and a reciprocating plate having depending blades arranged and adapted to pass the slots in the fixed blade, the blades reaching below the upper surface of the strip-supporting bed of the machine, substantially as shown and described.

14. In a cell-case machine, the combination of a rotary relatively-fixed slotted ledger-blade, as 25, provided with arms, as 24, and lugs, as 26, a reciprocating plate, as 28, provided with blades, as 29, and cams, as 28 and 31, for raising and lowering and for reciprocating said blades, substantially as shown and described.

15. The combination of an inclined endless belt or bottoming device, as 18, feed-rolls, as 19 and 20, and a fixed bed, as 11, substantially as shown and described.

16. In a cell-case machine, the combination of strip-forming mechanisms, as 2 3 and 4 5, presenting mechanism, as 10, rotary assembling mechanism, as 12, and bottoming mechanism, as 18, substantially as shown and described.

17. In a cell-case machine, the combination of continuously-operating rotary presenting mechanism, as 10, assembling mechanism, as 12, and bottoming mechanism, as 18, substantially as shown and described.

18. In a cell-case machine, the combination of presenting mechanism and assembling mechanism, each adapted, substantially as shown and described, to operate continuously, substantially as and for the purpose set forth.

In testimony whereof I affix my signature in presence of two witnesses.

EDGAR B. STOCKING.

Witnesses:
J. H. PAINE,
M. P. CALLAN.